UNITED STATES PATENT OFFICE.

RASIK LAL DATTA AND PHULDEO SAHAY VARMA, OF CALCUTTA, INDIA.

PROCESS OF PRODUCING TRINITRO COMPOUND FROM PHENOL.

1,292,266.  Specification of Letters Patent.  Patented Jan. 21, 1919.

No Drawing.  Application filed August 17, 1916. Serial No. 115,557.

*To all whom it may concern:*

Be it known that we, RASIK LAL DATTA and PHULDEO SAHAY VARMA, subjects of the King of Great Britain, residing at Calcutta, India, have invented certain new and useful Improvements in Processes of Producing Trinitro Compound from Phenol, of which the following is a specification.

The present invention relates to a process of producing a trinitro compound from a phenol.

The invention consists broadly in passing nitrous gases through a phenol thereby producing a trinitro compound. As examples of a phenol may be mentioned phenol, cresol, and other homologues.

Prior to our invention, trinitrophenol and trinitrocresol were produced by the nitration of phenol and cresol, respectively, by means of nitric acid, to which an excess of strong sulfuric acid had been added.

Our process differs from this old process, inasmuch as the prior process did not employ phenol sulfonic acid, freed from all substantial traces of phenol, and further, the nitration of phenol and cresol to form corresponding trinitro compounds had not before, as far as we are aware, been achieved by the means of nitrous gases.

In the practice of our process, in its preferred form, weighed quantities of phenol or cresol are digested with a little more than an equimolecular quantity of strong sulfuric acid, for a prolonged period, on the water-bath or sand-bath. The product thus obtained comprises phenol or cresol sulfuric acid and is also ordinarily found to contain a little free phenol or cresol. The nitrous gases employed are a mixture of nitrogen trioxid, $N_2O_3$, and nitrogen tetroxid, $N_2O_4$. These gases are obtainable from the electric arc process and from various chemical operations, such as heating nitric acid with a reducing agent, decomposing heavy metallic nitrates by heat, dissolving metals by nitric acid, etc. If these nitrous gases be now passed directly through this product, the free phenol or cresol, remaining in the small amounts with the sulfonic acid, becomes charred with a considerable diminution in the yield, thus making the product quite impure. On the other hand, it is found that pure phenol sulfonic acid or pure cresol sulfonic acid, free from uncombined phenol and cresol respectively, undergo nitration without the least charring or blackening of the product. For this reason, the resulting crude phenol sulfonic acid or the cresol sulfonic acid is subjected to steam distillation, for driving off all of the free or uncombined phenol or cresol, the same coming over with the steam, leaving the pure sulfonic acid behind. The free or uncombined phenol or cresol that come over with the steam, may be recovered from the water, according to any well known process, and again used.

Through the pure phenol sulfonic acid or cresol sulfonic acid, in water, we pass nitrous gases. This operation is continued until the absorption of the nitrous gases is stopped.

The resultant solution (when treating either pure phenol sulfonic acid or pure cresol sulfonic acid) has a pure yellow-color and consists of pure trinitrophenol or pure trinitrocresol, (depending upon the sulfonic acid used), with a very small quantity of sulfuric acid due to the breaking up of sulfonic radicles of phenol or cresol sulfonic acids.

The solutions on being concentrated to crystallization, solidify to a mass of crystals, which are secured or removed by suction. By the further evaporation of the mother-liquor a fresh crop of crystals is obtained.

Both the compounds thus obtained are found pure for all practical purposes, but if necessary, they may be purified by a single crystallization from hot water. The yield of trinitrophenol obtained is about 80% of the theory and that of trinitrocresol about 70% of the theory, which has never before been obtained by any other method, as far as we are aware.

The proportions of typical experiments are as follows:

For the production of trinitrophenol:

50 grams of phenol is converted into phenol sulfonic acid with 35 c. c. conc. $H_2SO_4$. Unchanged phenol distilled over 18 grams. Actual amount of phenol taking part in the reaction 32 grams. Yield of crude trinitrophenol obtained 58.6 grams (80%).

Production of trinitrocresol:

50 grams of cresol is converted into cresol-sulfonic acid with 32.5 c. c. conc. $H_2SO_4$. Unchanged cresol distilled over 10 grams.

Actual amount of cresol taking part in the reaction 40 grams. Yield of crude trinitrocresol obtained 63 grams (70%).

It is to be understood that the forms of our invention are to be taken as preferred examples of the same, and that various changes may be made in the proportions of the chemicals employed, and the order in the steps of the processes.

Having thus described the invention, we claim:

1. The process of producing a trinitro compound of a phenol, which consists in sulfonating a phenol, separating from the presence of the phenol sulfonic acids all traces of the uncombined phenol, subjecting the resultant product to the action of nitrous gases for the production of a trinitro phenol, and recovering the trinitro phenol.

2. The process of producing trinitro cresol, which consists in sulfonating the cresol, separating from the resultant product all uncombined cresol, treating the resultant product with nitrous gases, and recovering the trinitro cresol thus produced.

In testimony whereof we affix our signatures in presence of two witnesses.

RASIK LAL DATTA.
PHULDEO SAHAY VARMA.

Witnesses:
AUSHOOTOSH MOOKEYIE,
RUPERT REMFRY.

Copies of this patent may be obtained for five cents each, by addressing the "Commissioner of Patents, Washington, D. C."